United States Patent Office 3,522,174
Patented July 28, 1970

3,522,174
STABILIZED SALTY WELL FLUID
William A. Reddie, 5152 Huckleberry,
Houston, Tex. 77027
No Drawing. Continuation-in-part of application Ser. No. 487,037, Sept. 13, 1965. This application Sept. 30, 1968, Ser. No. 763,965
Int. Cl. C10m 3/32
U.S. Cl. 252—8.5                                17 Claims

ABSTRACT OF THE DISCLOSURE

Aqueous clay base drilling fluid containing a substantial amount of dissolved inorganic salts, such as are present in sea water, is stabilized against flocculation by the addition of an alkali metal, alkaline earth metal, or ammonium salt of a sulfated ethylene oxide adduct of long chain fatty alcohols.

The drilling fluid may optionally contain an oil emulsified therein, sulfonated alkyl diphenylether derivatives, an ethylene oxide polymer, monohydric and dihydric alcohols, thinners such as tannins, humates and chrome lignosulfonates, and metal stearate soaps.

---

This is a continuation-in-part of U.S. application Ser. No. 487,037, filed Sept. 13, 1965, now abandoned.

This invention relates to improvements in well fluids providing stabilization of the viscosity and gel strength of the fluid and to additives for such improved fluids.

In rotary drilling operations and in the completion and workover of wells, a drilling fluid or mud is used. The mud performs several functions which include lubrication of the drill stem, and bit, removal of cuttings from the bottom of the hole, maintenance of a hydrostatic seal against formation pressure, the prevention of hydration of shale and clay-like materials which are penetrated by the well bore and plastering the inner surface of the well to prevent loss of fluid from the borehole into surrounding formations. Most muds fail to perform one or more of these important functions under various circumstances.

The drilling muds usually used contain bentonite or some other hydratable clay to suspend cuttings and to support a weighting material such as barium sulfate which may be added to the mud to counteract formation pressures. However, drilling muds which contain hydratable clays dispersed in water are unsatisfactory for use under conditions in which the mud becomes contaminated with an electrolyte or for making the mud originally from oil field brines or from sea water. The electrolytes normally encountered are salts of strong bases and strong acids such as the soluble salts of sodium, calcium, magnesium and other elements frequently present in the formation penetrated by the borehole and encountered in drilling, as for example, when the drill penetrates the formation containing brine, or beds of salt, gypsum, anhydride, etc. Also in offshore drilling it is frequently necessary to use sea water containing the salts normally present in ocean water for making up drill fluids and in many coastal regions the only water available for making up well fluids will be brine. Frequently, a salt is also purposely added to drilling mud in order to decrease hydration of shales and heaving clays which may be penetrated by the well bore.

However, in aqueous muds which are principally suspensions of bentonite in water, it is well known that the presence of salt causes the clay to flocculate. If the salt is merely sodium chloride, strong flocculation usually occurs when the amount of salt reaches about 10,000 parts per million in the drilling fluid; but salts of divalent metals, as for example, calcium sulfate or chloride, frequently cause flocculation when the soluble salt is present merely to the extent of 1,000 parts per million. Mixtures of salts which are usually present in well fluids may cause a flocculation when the salt content of the well fluid is between 1,000 and 10,000 parts per million so that no exact concentration of salts can be stated as sufficient to cause flocculation since this varies with the particular mixture of salts present.

Flocculation of the clap particles results in large increase in the viscosity and yield point of the well fluid, and in increased gel strengths so that fluids in which the clay is flocculated are generally unsuitable for use in drilling and workover operation in wells.

It has been customary to combat flocculation of clays in aqueous systems by use of thinning agents such as tannins, humates, chrome lignosulfonates, chrome lignite and other dispersants. Highly alkaline muds are relatively inert to calcium salt contamination but they also have many disadvantages in that calcium is soluble to such a limited extent in the alkaline mud that its concentration cannot be raised high enough to prevent beds of clay and hydratable shales through which the wellbore penetrates from making mud; that is dissolving in the mud and becoming a part of the clay solids system therein, and these muds often tend to solidify in deep hot holes, possibly due to interaction of calcium, sodium hydroxide, and silica. These muds are also disadvantageous because of their extremely high pH and due to the fact that the presence of calcium in relatively large quantity frequently increases the fluid loss from the well fluid.

In offshore locations it is necessary either to use sea water for forming a well fluid or to transport water for long distances to the well. A stabilizer for salty mud which prevents the development of high viscosity, gel strengths and yield point of well fluids containing hydratable clay solids has long been desired in the industry.

It is an object of the present invention to provide a well fluid containing a novel stabilizer compatable with clay solids in quantities normally present in well fluids.

Another object is to provide a well fluid containing water, clay solids, salts in quantity normally effective to flocculate clay to an extent to cause the fluid to develop undesirable rheological properties and a novel stabilizer effective to prevent development of such undesirable properties.

It is another object of this invention to provide a well fluid containing such stabilizer which is easily prepared from sea water.

Another object is to provide a well fluid of the above type in which the clay may be hydrated before or after complete formulation of the well fluid.

Another object is to provide a well fluid of the above type in which the stabilizer is compatable with tannins, humates, alkalies, chrome lignosulfonate, chrome lignite and other common well fluid treating agents.

Another object is to provide a well fluid of the above type which reduces the quantity of chrome lignosulfonate and chrome lignite required to maintain desirable rheological properties in the fluid.

Another object is to provide a well fluid of the above type in which the novel stabilizer also reduces fluid loss.

Other objects and advantages will become apparent to those skilled in the art from the following detailed description.

In the present invention, a well fluid is contemplated which comprises water, a hydratable clay, salts in proportion normally resulting in flocculation of the clay and a novel stabilizing material. The new stabilizer is an alkali metal salt of the sulfated ethylene oxide adduct of a material selected from the group consisting of straight chain alcohols having from 6 to 22 carbon atoms per molecule and mixtures of such alcohols, and is made by reacting the selected material with ethylene oxides in proportions corresponding to 30 to 60 percent by weight of the resulting adduct, sulfating the resulting adduct by a well known reaction such as, for example, reacting the adduct with sulphur trioxide, and neutralizing the resulting sulfate with a material selected from the group consisting of hydroxides and alkaline salts of alkaline metals and metals of the alkaline earths, as for example, calcium and magnesium.

The new stabilizer can be employed as an additive for a well drilling fluid such as an aqueous clay base drilling fluid, the additive consisting essentially of from about 10 to about 90, preferably from about 60 to about 90, weight percent of at least one salt of the sulfated ethylene oxide adduct; from about one to about 86 weight percent of at least one monohydric and dihydric alcohols having from one to eight carbon atoms per molecule, inclusive, and from about 4 to about 10, preferably from about 4 to about 6, weight percent of at least one of aluminum stearate, alkali metal stearate, and alkaline earth metal stearate, all weight percents being based on the total weight of the additive.

The salt of the sulfated ethylene oxide adduct employed in the additive can be one or a mixture of materials having the formulae

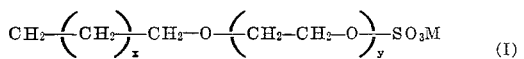

(I)

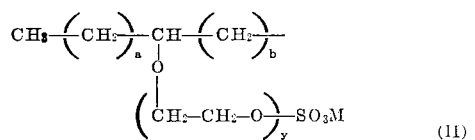

(II)

where $x$ is from 4 to 20, preferably 8 to 16, inclusive, $y$ is from 1 to 10, preferably 1 to 5, inclusive, $a$ is from 0 to 9, inclusive, $b$ is from 0 to 9 inclusive, $a$ plus $b$ is from 3 to 19, inclusive, and M is selected from the group consisting of alkali metals, alkaline earth metals, and ammonium. The alkali metals include lithium, sodium, potassium, rubidium, cesium, and francium, preferably lithium, sodium, potassium, and rubidium. The alkaline earth metals include beryllium, magnesium, calcium, strontium, barium, and radium, preferably, magnesium, calcium, strontium, and barium.

One alcohol or mixtures of 2 or more alcohols can be used. Suitable alcohols include methyl alcohol, ethyl alcohol, isopropyl alcohol, 2 ethyl hexanol, octyl alcohol, glycols such as triethylene glycol, and the like.

The stearate containing component of the additive can have from about 20 to about 30 weight percent free fatty acid, the weight percent being based on the total weight of the stearate component present in the additive. The term "free fatty acid" is meant to cover stearic acid which has not been reacted or otherwise combined with aluminum or alkali metal or alkaline earth metal to form the stearate salt.

Additional materials which can be incorporated in the additive if desired include from about 1 to about 10 weight percent wool grease, from about 0.5 to about 2 weight percent polyethylene oxide having a molecular weight of from about 300,000 to about 900,000, and from about 1 to about 10 weight percent of one or more oxy dibenzene compounds having the formulae

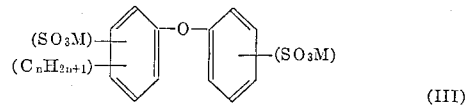

(III)

and

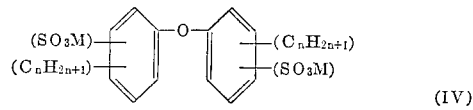

(IV)

where $n$ is from 8 to 16, inclusive, preferably 10 to 14, inclusive, still more preferably 12, and M is selected from the group consisting of ammonium hydrogen, alkali metals, and alkaline earth metals, as set forth hereinabove with respect to Formulae I and II. The alkyl substituent ($C_nH_{2n+1}$) can be linear or branched and can be on the benzene ring in the ortho, meta, or para position, preferably para, relative to the oxygen linkage. The sulfonate substituent can be ortho, meta, or para, preferably ortho or para, relative to the oxygen linkage. A presently preferred oxy dibenzene composition consists essentially of at least 50 weight percent of one or more compounds of Formula III, the remainder being substantially one or more compounds of Formula IV, the weight percent being based on the total weight of the oxy dibenzene composition. The sulfonate and alkyl substituents normally occupy different positions on any single benzene ring.

These additional materials are not required for the additive of this invention but can be added as desired singly or in combinations of two or more. For example, wool grease, polyethylene oxide, and one or more than one of the oxy dibenzene compounds can be employed together in the additive. Whether any, all, or any combination of these materials is employed in a particular additive depends upon the specific situation in which the additive is to be employed and it will be obvious to those skilled in the art what materials, if any, can be employed in any given situation. For example, when more than 150,000 parts per million of sodium chloride is present in a drilling fluid and there is substantially no calcium, magnesium or potassium present, it may be desirable to employ one or more oxy dibenzene compounds with or without wool grease or polyethylene oxide. If calcium, magnesium or potassium is present in the drilling fluid in measurable amounts, the sodium chloride tolerance is decreased below 150,000 parts per million but the specific parts per million tolerance for sodium chloride in this situation varies widely and cannot be specified without knowing the specific compounds present and their amounts. The fact remains, however, that when sodium chloride is present in the drilling fluid with or without calcium, magnesium, or potassium, it can be desirable to employ an oxy dibenzene compound.

The oxy dibenzene compounds, wool grease, and polyethylene oxide are all articles of commerce which are well known to those skilled in the art and, therefore, further description of these materials is not necessary to inform the art and can be omitted.

An additive composition which can be employed is the use of an adduct of Formula I where $x$ is from 10 to 14, inclusive, $y$ is from 1 to 5, inclusive, and M is sodium or an adduct of Formula II wherein a plus $b$ is from 10 to 16, each adduct being used by itself in the additive, and each adduct having in combination therewith from about 5 to about 9 weight percent isopropyl alcohol, from about 1 to about 4 weight percent triethylene glycol, from about 2 to about 6 weight percent aluminum stearate, from about 1 to about 10 weight percent wool grease, from about 0.5 to about 1 weight percent polyethylene oxide as described hereinabove, and sufficient sodium hydroxide to give the final additive a pH of from about 6.5 to about 7, all weight percents being based on the total weight of the final additive. In addition to the just-mentioned materials, up to 4 weight percent, based on the total weight of the additive, of water can be employed if desired.

It is preferred that the starting alcohol material which is reacted with ethylene oxide be a mixture of straight chain alcohols containing from 10 to 18 carbon atoms per molecule since such mixtures of alcohols are produced by several manufacturers on a large scale and at a low price. These mixtures are usually made from petroleum materials and one preferred mixture contains:

| | Percent |
|---|---|
| $C_{12}$ alcohols | 20 |
| $C_{13}$ alcohols | 30 |
| $C_{14}$ alcohols | 30 |
| $C_{15}$ alcohols | 20 |

This mixture is sold under the trade name "Neodol 25." Another excellent mixture of the straight alcohols containing:

| | Percent |
|---|---|
| $C_{12}$ alcohols | 40 |
| $C_{14}$ alcohols | 30 |
| $C_{16}$ alcohols | 20 |
| $C_{18}$ alcohols | 10 | is sold under the trade name "Alfol 1218." Still another preferred mixture of alcohols contains:

| | Percent |
|---|---|
| $C_{10}$ alcohols | 30 |
| $C_{12}$ alcohols | 40 |
| $C_{14}$ alcohols | 30 |

This mixture is sold under the trade name of "Alfol 1014." It should be noted that the "Alfol" products consist substantially exclusively of straight chain alcohols having an even number of carbon atoms. This seems to be due to the fact that these alcohols are made by the Ziegler process which produces a product containing substantially no alcohols having an odd number of carbon atoms in the chain.

Another preferred material is sold under the trade name "Richanol 1285–S." This is a sodium salt of a sulfated ethylene oxide adduct of a mixture of $C_{10}$ and $C_{14}$ straight chain alcohols. The sodium salt of sulfated ethylene oxide adduct is prepared by reacting an alcohol or one of the preferred mixtures of alcohol with from 40 to 60 percent by weight of ethylene oxide sulfating the adduct with sulfur trioxide and neutralizing the product with sodium hydroxide.

To prepare the stabilizer of the present invention, a straight chain containing 6 to 22 carbon atoms per molecule of alcohol or preferably a mixture of such alcohols is reacted with ethylene oxide in proportion with about 40 to 60 percent of the weight of alcohol. The resulting adduct is then sulfated, usually by reaction with sulfur trioxide, and the resulting reaction product is neutralized by an hydroxide or alkaline salt of an alkali or calcium or magnesium.

Such sodium salts have been known prior to this invention and have been used as detergents. Apparently, these have never been used in drilling fluid before because of the fact that they are strong foam producing materials, especially in fresh water. It has now been found that although such alkali metal salts of sulfated ethylene oxide adducts cause extreme foaming when used in preparing a mud from fresh water, they do not foam nearly as much when the water contains salts in proportion normally resulting in flocculation of clay solids contained in a well fluid. In fact, the foaming is reduced sufficiently that it can be economically controlled by addition of a defoaming agent, such as aluminum stearate for example.

It is preferred that the well fluid of the present invention also contain a minor amount of oil emulsified therein. When the fluid contains no oil about 0.25 to 0.5 pound per barrel of the new stabilizer is required to maintain good rheological conditions in the presence of sufficient salt to normally flocculate the clay, but when the fluid contains oil about 0.05 to 6 pounds per barrel of the stabilizer should be used. The fluid may be prepared fresh by suspending a hydratable clay in water, adding the required amount of stabilizer and any other ingredients desired, or it may be prepared by breaking over a drilling fluid used in drilling an upper part of the well by addition of the new stabilizer.

The new stabilizer is particularly effective in cooperation with chrome lignosulfonate and chrome lignite in well fluids containing a minor proportion of oil emulsified in the aqueous phase under conditions where large amounts of chrome lignosulfonate and chrome lignite must be used to maintain desirable rheological conditions due to contamination of the well fluid by salts, or intentional inclusion of salts in the fluid, as for example in preparing sea water muds. Relatively small amounts of chrome lignosulfonate and chrome lignite in admixture with the new stabilizer are much more effective in salty well fluids than much larger amounts of chrome lignosulfonate and chrome lignite used alone. This is true both when chromium is the only metal present in the chrome lignosulfonate and when the chrome lignosulfonate contains appreciable quantities of iron, copper, or other metal, as many of the commercially available materials do. The term "chrome lignosulfonate" is used in this specification and claims to include all chrome lignosulfonates whether or not appreciable amounts of other metals such as iron and copper are included in the complex material.

The new stabilizer also is compatible with the other usual thinning and water loss reducing agents normally used in drilling fluids, as for example, tannins, humates, CMC, NaOH, etc. so that no difficulties are encountered in breaking over drilling fluids containing such materials to the present stabilized fluid.

In order to prepare the stabilizers of the present invention in liquid form easily blended into a well fluid, it is often necessary to dilute the stabilizers with a small amount of water and alcohol.

In preparing the fluid, whether the fluid be prepared directly from clay, water containing salts, and oil, or by breaking over a drilling mud which has been used in drilling an earlier part of the well and which may contain common thinning agents such as tannins, humates, chrome lignosulfonate, chrome lignite and other thinners and/or fluid loss reducing agents, it is preferred that the stabilizer of the present invention be added in a liquid mixture with other materials.

Liquid mixtures of the stabilizer and other materials may be prepared by adding isopropyl alcohol, aluminum stearate, and triethylene glycol to the liquid stabilizer which may contain only 60 percent of the active material together with 30 percent water and to 10 percent ethanol. The isopropyl alcohol in this mixture serves as a carrier for the aluminum stearate which is in itself a defoamer. The triethylene glycol serves as a coupling agent for wool grease or Degras to be added later. The isopropyl alcohol, aluminum stearate and triethylene glycol are thoroughly mixed with the novel stabilizer and a small amount of Degras, a commercial product prepared by acid cracking wool grease, or wool grease is added to the mixture to serve as an oiliness agent and lubricant in the well fluid. A small amount of "Cab-O-Sil," a submicroscopic particulate silica prepared in a hot gaseous environment at 1100° C. or so by vapor phase hydrolysis of a silicon compound is added and serves to prevent settling of aluminum stearate in the mixture. Sodium hydroxide may be added if desired. The liquid mixture is then added to a clay suspension and is agitated to incorporate the mixture into the drilling fluid. Sufficient of the mixture is added to furnish from about 0.25 to 6 pounds per barrel of stabilizing material to the drilling fluid. When the fluid contains no oil quantities near the lower limit of this range are used and when oil is present quantities in the upper part of this range are preferred.

One preferred mixture for adding the novel stabilizer to drilling fluid is designated as 59-A in the following examples and has the base composition as follows:

| Order of Addition | Material | Percent by Weight | Purpose |
|---|---|---|---|
| 1 | Richanol 1285-S [1] | 80.5 | Mud Stabilizer. |
| 2 | Isopropyl Alcohol | 9.0 | Carrier of Stearate. |
|   | Aluminum Stearate | 4.0 | Defoamer. |
|   | Triethylene Glycol | 1.5 | Coupling Agent for Wool Grease. |
| 3 | Degras or Wool Grease. | 4.0 | Oiliness Agent and Lubricant. |
| 4 | Cab-O-Sil [2] | 1.0 | Prevention of settling of Aluminum Stearate. |
| Total |   | 100.0 |   |

50% NaOH,[3] Percent (0.30-0.35)/(70-80) pounds
Antifoam #66, Percent (0.05)/(12) pounds (Silicone type)

[1] Richanol 1285-S = Sodium Alcohol ether sulfate prepared from a blend of $C_{10}$ and $C_{14}$ petrochemical derived straight chain alcohol ethoxylates containing 40% ethylene oxide by final weight; 60% active with balance 30% water and 10% ethyl alcohol.
[2] Cab-O-Sil = A sub-microscopic particulate silica prepared in a hot gaseous environment 1,100° C. by the vapor phase hydrolysis of a silicon compound.
[3] 50% NaOH to be added to adjust pH to 6.5–7.0.

When oil is present in a salty well fluid at very low concentration, as for example 3%, the mixture 59-A has been found to have the ability to approximately halve the fluid loss from the fluid while it also stabilizes the rheological properties of the fluid. When oil is used at concentration of about 10% it was found that 3 pounds per barrel of this mixture reduced the fluid loss about 43%. The mixture 59-A was also varied by including in its formula about 0.5% of a silicone defoamer. The following example illustrates the results obtained by use of the mixture 59-A and the mixture 59-A-S containing the silicone defoamer.

EXAMPLE I

A sea water mud was prepared having the following formula:

Galveston sea water—3,150 cc.
Subbentonite clay—600 grams
Wyoming bentonite—340 grams
Chrome lignite—20 grams
Chrome lignosulfonate—40 grams
50% solution of sodium hydroxide—40 grams This fluid was aged overnight. To aliquots of the fluid, diesel oil was added in the amount indicated in the following table along with the stabilizer designated 59-A and 59-A-S shown in the table. The complete well fluid was then mixed for 10 minutes on a Hamilton Beach mixer, aged overnight and the properties were determined. The following results were obtained:

TABLE I

| Mud No. | Stabilizer | Percent Oil | Initial Form | Aged overnight (Static) at 150° F. | | | | | |
|---|---|---|---|---|---|---|---|---|---|
|   |   |   |   | A.V. | P.V. | Y.P. | Gels | pH | API |
| 1 | None | 0 | 0 | 22 | 14 | 16 | 7/21 | 8.0 | 27.0 |
| 2 | 3, 59-A | 0 | 30 | 40 | 33 | 13 | 7/27 | 8.0 | 19.8 |
| 3 | None | 3 | 5 | 27 | 18 | 17 | 8/30 | 8.0 | 22.0 |
| 4 | 3, 59-A | 3 | 0 | 22 | 15 | 13 | 6/23 | 8.1 | 11.8 |
| 4S | 3, 59-A-S | 3 | 0 | 23 | 14 | 17 | 7/28 | 8.1 | 11.8 |
| 5 | None | 6 | 10 | 25 | 18 | 14 | 6/20 | 8.0 | 20.5 |
| 6 | 3, 59-A | 6 | 0 | 23 | 15 | 15 | 6/25 | 8.1 | 10.2 |
| 7 | None | 10 | 0 | 40 | 25 | 30 | 16/25 | 8.1 | 16.4 |
| 8 | 3, 59-A[1] | 10 | 6 | 25 | 16 | 17 | 7/25 | 8.1 | 9.4 |
| 9 | 3, 59-A-S[1] | 10 | 3 | 23 | 16 | 14 | 6/24 | 8.1 | 9.8 |

[1] Contains 0.5% Silicone #66.

EXAMPLE II

The "Alfonic 1218-S" stabilizer described above was evaluated in a Galveston sea water mud containing 10% diesel oil by final volume. After the oil and water emulsion was formed, 80 pounds per barrel of subbentonitic and bentonitic clays were added and this addition was followed by heat aging for 16 hours static at 150° F.

The properties of the resulting fluid were then determined and the following results were obtained:

TABLE II

| Surfactant | Concentration, lb./bbl. | App. Vis. | Plastic Vis. | Y.P. | Fann Gels Initial 10 Min. | Std. API Fluid Loss |
|---|---|---|---|---|---|---|
| Alfonic 1218-S | 0 | 29 | 10 | 38 | 23/42 | 26.0 |
| Do | 1 | 22 | 10 | 24 | 20/38 | 21.0 |
| Do | 3 | 24 | 13 | 22 | 22/36 | 16.8 |

It was noted that a very large reduction in fluid loss was obtained while at the same time the apparent viscosity, yield point and gel strengths of the fluid were slightly decreased and the plastic viscosity was only slightly higher. This fluid thus was stabilized by use of the "Alfonic 1218-S" sodium salt.

EXAMPLE III

There is increasing interest in some areas of the United States such as the mid-continent West Texas areas, in a fluid which would have the following properties:

(1) Contain as the oil phase and asphalt blend of a high softening point air oxidized asphalt and a high aniline number petroleum distillate which could be efficiently emulsified into a low solids system containing high concentration of sodium chloride (60,000 to 200,000 p.p.m.) and calcium plus magnesium (2,000 to 6,000 p.p.m.), and also include an emulsifier preferably of the anionic type which would be compatible with drilled solids.

(2) Solids content to be no higher than 4% by volume.

EXAMPLE IV

The effect of increasing concentrations of sodium chloride and calcium chloride on the performance of the preferred stabilizer has been studied in a system containing:

Base water [1]—329 cc.
Subbentonitic and bentonitic clay solids—94 lb./bbl.
Chrome lignite—2 lb./bbl.
Chrome lignosulfonate—4 lb./bbl.
NaOH—1 lb./bbl.
Diesel oil (6% by final volume)—21 cc.

The stabilizer was added to these systems in a concentration of 3 lb./bbl. In each case the fluid was mixed 10 minutes at high speed and aged for 16 hours static at 150° F. Properties are summarized below:

| Base Water | Stabilizer Concentration | A.V. | Y.P. | Fann Gels | pH | Std. API Fluid Loss |
|---|---|---|---|---|---|---|
| Tap | 0 | 28 | 9 | 2/13 | 8.4 | 6.8 |
| Tap | [1] 3 | 29 | 8 | 2/11 | 8.4 | 5.8 |
| 10,000 p.p.m. NaCl, 200 p.p.m. CaCl | 0 | 47 | 28 | 12/44 | 7.7 | 7.6 |
| 10,000 p.p.m. NaCl, 200 p.p.m. CaCl | 3 | 34 | 3 | 6/28 | 7.6 | 6.8 |
| 20,000 p.p.m. NaCl, 400 p.p.m. CaCl | 0 | 44 | 31 | 17/57 | 7.4 | 8.8 |
| 20,000 p.p.m. NaCl, 400 p.p.m. CaCl | 3 | 15 | 5 | 4/20 | 7.7 | 7.4 |
| 30,000 p.p.m. NaCl, 600 p.p.m. CaCl | 0 | 51 | 20 | 14/45 | 7.5 | 15.4 |
| 30,000 p.p.m. NaCl, 600 p.p.m. CaCl | 3 | 41 | 30 | 10/41 | 7.5 | 10.6 |
| 40,000 p.p.m. NaCl, 800 p.p.m. CaCl | 0 | 61 | 52 | 28/42 | 7.2 | 17.0 |
| 40,000 p.p.m. NaCl, 800 p.p.m. CaCl | 3 | 37 | 28 | 13/30 | 7.4 | 14.2 |
| 80,000 p.p.m. NaCl, 1,600 p.p.m. CaCl | 0 | 40 | 30 | 20/31 | 7.1 | 26.0 |
| 80,000 p.p.m. NaCl, 1,600 p.p.m. CaCl | 3 | 16 | 8 | 5/19 | 7.3 | 29.8 |

[1] Extreme foam.

(3) Standard API Fluid loss which could be decreased to as low as 3 to 4 ccs.
(4) A viscosity which could be increased by a material such as Dris-Pac (polyanionic) or high viscosity CMC, with this additive compatible with the emulsifier.

A well fluid having properties meeting the above requirements was prepared as follows:

Tap water—350 cc.
Chrome lignite—4 lb./bbl.
Chrome lignosulfonate—2 lb./bbl.
NaOH—0.7 lb./bbl.
Sodium chloride—60 lb./bbl.
Asphalt blend by final volume—8%
Preferred stabilizer 59-A—3 lb./bbl.

After stirring for ten minutes on a one gallon Waring Blendor and heat aging overnight static at 150° F., this fluid had an apparent viscosity of 2 cp., a pH of 10.1, and Standard API Fluid loss of 2.8 cc. emulsion. The viscosity of the fluid was found to be substantially increased by the addition of Dris-Pac or high viscosity CMC. This fluid also is compatible with drilled solids. From the above tests the following two conclusions can be drawn:

If no stabilizer were present, the fluid loss would be in excess of 25 cc.

(1) The stabilizer in high concentration gives extreme foam in a tap water system but contributes little to improved flow properties and fluid loss control.
(2) In systems containing relatively high concentrations of sodium chloride and calcium chloride, the stabilizer can contribute even more to the control of flow properties than to the control of fluid loss.

EXAMPLE V

A sodium salt of a sulfated ethylene oxide adduct made by reacting a mixture of straight chain alcohols having 10 to 15 carbon atoms per molecule with ethylene oxide in amount equal to 40% of the weight of the resulting adduct, sulfating the resulting adduct with $SO_3$ and neutralizing the sulfated adduct with sodium hydroxide was prepared. The effect of this salt in maintaining rheological properties of well fluids was studied. Results and details are given in the following tables in which this salt is designated "P/C Anionic."

[1] Composition of base water: (1) Tap water. (2) 10,000 p.p.m. NaCl+200 p.p.m. CaCl₂. (3) 20,000 p.p.m. NaCl+400 p.p.m. CaCl₂. (4) 30,000 p.p.m. NaCl+600 (CaCl₂. (5) 40,000 p.p.m. NaCl+800 .p.m. CaCl₂. (6) 80,000 p.p.m. CaCl+1600 p.p.m. CaCl₂

TABLE II.—COMPARISON OF NEW STABILIZER WITH PETROLEUM SULFONATES AND TALL OIL SOAP IN OIL EMULSION FLUIDS CONTAINING CONSIDERABLE CONCENTRATION OF ELECTROLYTES

| Mud System | ADDITIVE AND CONCENTRATION | | | | | | | | | | | |
|---|---|---|---|---|---|---|---|---|---|---|---|---|
| | Stabilizer, lb./bbl. | Chrome Ligno-sulfonate, lb./bbl. | Chrome lignite, lb./bbl. | NaOH, lb./bbl. | Clay Solids, lb./bbl. | Barite, lb./bbl. or wt. lb./gal. | Aging Conditions (static at °F.) | App. Vis. | YP | Gels, In./10 min. | Standard API Fluid Loss |
| Base Sea Water Emulsion (System contains 10% diesel oil by final volume Galveston sea water as aqueous phase 60 lb./bbl. sub-bentonite 20 lb./bbl. bentonite clay solids. Clay solids added prior to heat aging). | | | | | | | 16 hours at 150 | 24 | 30 | 32/32 | 24.2 |
| Base plus: | | | | | | | | | | | |
| Do | 3 Tall Oil Soap X | | | | | | do | 17 | 20 | 18/32 | 25.6 |
| Do | 3 P/C Anionic | | | | | | do | 24 | 22 | 22/36 | 16.8 |
| Do | do | | 4 | 2 | | | 2½ days 150 | 46 | 22 | 5/28 | 7.7 |
| Do | 2 Tall Oil Soap X | 8 | 4 | 2 | | | do | 44 | 36 | 9/55 | 7.2 |
| Do | 2 P/C Anionic | 8 | 4 | 2 | | | do | 32 | 16 | 2/20 | 6.0 |
| Base Sea Water Emulsion | | | 8 | 5.6 | | {235 bbl. 12 lb./gal.} | }16 hours at 150 | 23 | 2 | 1/2 | 2.0 |
| Base plus | 16 | | | | | | | | | | |
| Do | 2 P/C Anionic | 16 | 8 | 5.6 | 30 | | do | 68 | 29 | 11/18 | 1.6 |
| Do | do | 16 | 8 | 5.6 | | | do | 26 | -7 | 1/2 | 2.6 |
| Do | | 16 | 8 | 5.6 | 30 | | do | 51 | 20 | 10/15 | 1.5 |
| Do | 2 P/C Anionic | 8 | 4 | 4 | | | do | 25 | 0 | 2/3 | 3.2 |
| Do | do | 8 | 4 | 4 | 30 | | do | 65 | 46 | 29/34 | 3.3 |
| Do | 2 P/C Anionic | 8 | 3 | 4 | | | do | 27 | -9 | 2/3 | 3.4 |
| Do | do | 6 | 3 | 4 | 30 | | do | 60 | 22 | 17/33 | 7.2 |
| Do | 2 P/C Anionic | 6 | 3 | 3.6 | | | do | 28 | 7 | 3/6 | 7.6 |
| Do | do | 6 | 3 | 3.6 | 30 | | do | 130 | 98 | 110/140 | 7.0 |
| Do | 2 P/C Anionic | 6 | 3 | 3.6 | | | do | 24 | -7 | 1/2 | 7.0 |
| Do | do | 6 | 3 | 3.6 | 30 | | do | 52 | 19 | 13/18 | 4.0 |
| Base Sea Water Emulsion (System contains 10% diesel oil by final volume Galveston sea water as aqueous phase 75 lb./bbl. sub-bentonite and 25 lb./bbl. bentonite clay solids. Clay solids added prior to heat aging). | 9 | | 3 | 3 | | 1 | do | 18 | 0 | 0/0 | 15.8 |
| Base plus | 2 P/C Anionic | 8 | 3 | 3 | 30 | | do | 60 | 20 | 10/40 | 9.8 |
| Do | do | 8 | Light treatment | 3 | 30 | | do | 53 | 4 | 0/12 | 7.2 |
| Salt Mud from a well in Wyoming, depth 7,870′ (properties as received weight 9.2 lb./gal., rheological properties at 115° F. as indicated. Salt 36,080 p.p.m., calcium 1,690 p.p.m., oil content 6%. This mud contained bentonite, attapulgite, chrome lignosulfonate, chrome lignite, starch, Soda Ash and Preservative). | | Light treatment | Light treatment | | | None | do | 8 | 6 | 7/9 | 54.2 |
| Base plus | Petroleum 2 Sulfonate | | | | | | do | 7 | 6 | 5/8 | 42.0 |
| Do | 2 Tall Oil Soap X | | | | | | do | 7 | 4 | 5/6 | 38.8 |
| Do | 2 P/C Anionic | | | | | | do | 8 | 0 | 4/5 | 14.0 |
| Do | 2 Starch but no emulsifier | | | | | | do | 10 | 8 | 8/14 | 14.2 |

TABLE III.—PERFORMANCE OF NEW STABILIZER IN SEA WATER AND BRINE FLUIDS

| Mud system | Concentration Stabilizer | Aging Conditions | App. Vis. | YP | Gels, In./10 min. | Standard API Fluid Loss | EP Pass Load (lbs) | Scar Width (mm) |
|---|---|---|---|---|---|---|---|---|
| Sea water oil emusion 10% diesel oil by final volume | 8 lb./bbl.[1] | Immediate | 1 cp., 115° F | | | 7½ min., 3.4 cc., strong emulsion | 40 | 1.5 |
| Above plus | {10 lb./bbl./attapulgite +5 lb./bbl. bentonite 10lb./bbl. attapulgite} | 7-10-64 | 3 cp., 115° F | | | 7½ min., 12 cc., strong emulsion | 40 | 1.6 |
| Do | +5 lb./bbl. bentonite | Aged at room temp. until 7-15-64 | 4 | 2/- | 23.6 strong emulsion | | 100 | 2.5 |
| Salt Mud from well in Wyoming, depth 7,370′ (properties as received weight 9.2 lb. gal. rheological properties at 115° F. as indicated. Salt 36,080 p.p.m., calcium 1,600 p.p.m. oil content 6%. This mud contained bentonite, attapulgite, chrome lignosulfonate, chrome lignite, starch, soda ash and preservative). | | Immediate | 7 | 5/- | 53.2 | | | |
| Above plus | 4 lb./bbl. | do | 6 | 4 | 5/8 | 26 | 40 ph adj. to 9.4 | 2.9 |
| Base plus | 3 lb./bbl. stabilizer | do | 9 | 2 | 2/- | 15.4 | {60 ph adj. to 9.4 40} | 3.2 / 2.9 |

[1] This is composed of 2 parts by weight Potrochemical Anionic, 1 part by weight Micro-Cel E and 5 parts by weight Vinsol Resin.

EXAMPLE VI (Field test with preferred stabilizing additive in off-shore sea water mud)

This example illustrates the performance of the preferred stabilizer of this invention in a sea water mud off-shore, Louisiana. The following pilot tests were made at a depth of approximately 8100′. In this well 10¾″ surface casing had been set at a depth of 3002′ and a 9⅞″ bit was being used.

| Additive | Depth, feet | Viscosity, secs./cp. | Plas. Vis. | YP | Gels | API FL | pf | pm | Chloride, p.p.m. | Calcium, p.p.m. | Solids, percent | Oil, percent |
|---|---|---|---|---|---|---|---|---|---|---|---|---|
| Base Mud | 9,130 | 35 | 12 | 11 | 2 | 1/8 | 17.8 | 0.6 | ------ | 26,000 | 580 | 20 | 0 |
| Diesel Oil | 9,280 | 37 | 18 | 15 | 5 | 1/14 | 13.0 | 0.6 | ------ | 26,000 | 560 | 21 | 4 |
| Above plus 2 lb./bbl. preferred stabilizing additive 59-A | 9,550 | 42 | 16 | 15 | 3 | 1/4 | 6.2 | 0.1 | ------ | 24,000 | 440 | 20 | 4 |

Based upon these pilot tests the mud was converted with the following properties obtained on a flow line sample taken the following day at a depth of 8175′.

| Additive | Wt., lb./gal. | Viscosity, secs./cp. | Plas. Vis. | YP | Gels, in./10 min. | pH | API FL | Chloride, p.p.m. | Calcium, p.p.m. | Percent Clay Solids | Oil percent |
|---|---|---|---|---|---|---|---|---|---|---|---|
| Base Mud | 9.7 | 33 | 9 | 8 | 2 | 0/7 | 8.5 | 20.4 | 28,000 | 160 | 9 | 8 |
| 8 lbs./bbl. chrome lignosulfonate plus 4 lbs./bbl. chrome lignite plus 1 lb. bbl. NaOH plus 1 lb. bbl. lime | 9.7 | ------ | 12 | 12 | 0 | 0/2 | 11.5 | 4.5 | 28,000 | 240 | ------ | ------ |
| Above, plus 3 lbs./bbl. stabilizing additive | 9.7 | ------ | 6 | 6 | 1 | 0/0 | ------ | 3.0 | ------ | ------ | ------ | ------ |
| Base Mud, plus 3 lbs./bbl. preferred stabilizing additive | 9.7 | ------ | 8 | 7 | 2 | 0/10 | ------ | 9.0 | ------ | ------ | ------ | ------ |

| Additive | Wt., lb./gal. | Viscosity, secs./cp. | Plas. Vis. | YP | Gels, in./10 min. | pH | API FL | Chloride, p.p.m. | Calcium, p.p.m. | Percent Clay Solids | Oil percent |
|---|---|---|---|---|---|---|---|---|---|---|---|
| 8 lb./bbl. chrome lignosulfonate plus 4 lbs./bbl. chrome lignite plus 1 lb./bbl. NaOH plus 1 lb./bbl. lime plus 3 lbs./bbl. preferred stabilizing additive | 10.2 | 43 | 18 | 17 | 3 | 0/8 | 11.0 | 4.9 | 22,000 | 280 | 13 | 8 |

It should be noted that at the time of the above conversion the drilling rate was 50′ per hour and after the addition of 3 lbs./bbl. of the preferred stabilizing additive the drilling rate increased to 100′ per hour. The Fluid Loss of the Base Mud without oil was 12.0 cc.; after the addition of 8% oil the Fluid Loss was 8.2 cc.; and after the addition of 3 lbs./bbl. preferred stabilizing additive the Fluid Loss had reduced to 4.9 cc.

Significant improvements in mud stability were noted after the addition of the preferred stabilizing additive with up to 30% reductions in requirements of chrome lignosulfonates and chrome lignite additives.

This well was drilled into salt at a depth of 12,650 ft. The chloride content rose to 40,000 p.p.m. at this time but the rheological properties remained substantially stable.

EXAMPLE VII

This example illustrates the use of the preferred stabilizing additive 59-A in a low brine emulsion fluid for drilling a section of the sensitive Abo Shale in a well in Lea County, New Mexico. 110 bbls. of an asphalt and distillate blend were added to a 1200 bbl. system of a brine fluid containing 86,000 p.p.m. chloride. A 7⅞″ hole was being drilled at 7100′. At this depth the preferred stabilizing additive 59-A was added in a concentration of 1½ lb./bbl. At the depth of 7388′, the fluid had the following properties:

Weight, 9.3 lb./gal.; funnel viscosity, 29°; pH, 6; API FL, 0.8; chloride p.p.m., 84,000; oil, percent, 6; solids, percent, 3% by volume.

During this interval no other additives were used.

A similar brine water containing natural clay solids and 8% asphalt distillate blend checked in the lab had an API Fluid Loss of 120 cc. The addition of 3 lbs./bbl. preferred stabilizing additive reduced the Fluid Loss to 12 cc.

EXAMPLE VIII

A field test of the effect of the preferred stabilizer 59-A was performed on sea water mud at a well off shore from Louisiana.

The properties of a base mud being used in drilling this were taken from the mud system when the well had reached a depth of 9130 feet. Four percent of diesel oil was added to the mud and properties were again determined when the well reached a depth of 9280 feet.

Two pounds per barrel of the preferred stabilizer mixture 59-A were added and a sample of mud was withdrawn and tested when the well reached a depth of 9550 feet. The following results were obtained:

The flow line properties of the mud were also improved by addition of the preferred stabilizing additive.

EXAMPLE IX

The operabilty of oxy dibenze material with the additive of this invention in a salt saturated environment was demonstrated using a base mud composed of a mixture of Sea water saturated with NaCl—315 cc.
Subbentonitic and bentonitic clay solids—60 lb./bbl.
Wyoming bentonite—34 lb./bbl.
Chromium lignite—2 lb./bbl.
Chromium lignosulfonate—4 lb./bbl.
NaOH—2 lb./bbl.
Diesel oil—35 cc.

The mud was prepared by adding the materials in the order indicated above to the sea water. The mixing was carried out at room temperature and the addition of materials was accomplished with mixing over a period of about 1 hour.

Six additive compositions were employed; these compositions being formed by mixing at about 120° F. for about 5 minutes of 2 or more or the following materials:

(A) Formula I, hereinabove, where M is Na, $x$ is 10 to 14, inclusive, and $y$ is 1–5, inclusive;
(B) Sodium salt of sulfonated dodecyldiphenyloxide, 45% active;
(C) Isopropyl alcohol.

The six additive compositions were:

(1) 80 weight percent A, 15 weight percent B, 5 weight percent C
(2) 80 weight percent A, 20 weight percent B
(3) 75 weight percent A, 25 weight percent B
(4) 70 weight percent A, 30 weight percent B
(5) 60 weight percent A, 40 weight percent B
(6) 50 weight percent A, 50 weight percent B Seven tests were made, each using one of the 6 additive compositions, the seventh test being a control run with no additive. In the first 6 tests, the additive composition was added to the base mud in a concentration of 4 lb./bbl. with mixing for 10 minutes at room temperature and static aging at 150° F. for 16 hours. The results of the tests were as follows:

| Test | Additive | Apparent Viscosity[1] | Plastic Viscosity | Yield Point[1] | Gel Strength,[1] initial/ 10 min. | API Low Temperature Fluid Loss, cc. | Percent Fluid Loss Reduction |
|---|---|---|---|---|---|---|---|
| I | 1 | 16 | 8 | 15 | 14/16 | 34 | 17 |
| II | 2 | 14 | 8 | 11 | 11/13 | 31 | 24.4 |
| III | 3 | 12 | 7 | 9 | 8/12 | 29 | 29.25 |
| IV | 4 | 12 | 7 | 10 | 8/13 | 26 | 36.6 |
| V | 5 | 12 | 7 | 9 | 5/13 | 20.8 | 49.3 |
| VI | 6 | 13 | 7 | 11 | 6/14 | 21.6 | 47.4 |
| VII | | 24 | 10 | 27 | 21/53 | 41 | |

[1] API tests with viscometer using 600 r.p.m. and 300 r.p.m. values.

The above data shows that the additive thinned the mud and at the same time reduced the fluid loss, both of which results are beneficial.

This invention also contemplates a process for drilling a well in which a well fluid containing a new stabilizer described above is circulated through the well while a drilling step is being carried out.

From the foregoing, it will be seen that this invention is one well adapted to attain all of the ends and objects hereinabove set forth, together with other advantages which are obvious and which are inherent to the composition and process.

It will be understood that certain features and hubcombinaitons are of utility and may be employed without reference to other features and subcombinations. This is contemplated by and is within the scope of the claims.

As many possible embodiments may be made of the invention without departing from the scope thereof, it is to be interpreted as illustrative and not in a limiting sense.

The embodiments of the invention in which an exclusive property or privilege is claimed are defined as follows:

1. An aqueous clay base drilling fluid consisting essentially of:
   a swelling clay;
   salts in proportion normally resulting in flocculation of the clay; and
   a sulfated ethylene oxide adduct which is at least one of:
   (1) Formula I

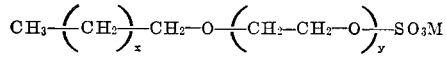

(2) Formula II

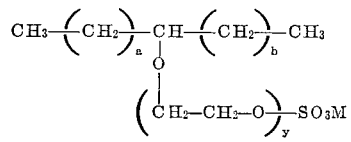

where
   $x$ is from 4 to 20, inclusive
   $y$ is from 1 to 10, inclusive
   $a$ is from 0 to 9, inclusive
   $b$ is from 0 to 9, inclusive
   $a$ plus $b$ is from 3 to 19, inclusive, and
   M is selected from the group consisting of alkali metal, alkaline earth metal, and ammonium,
   said ethylene oxide adduct being present in the drilling fluid in a quantity sufficient to substantially stabilize rheological properties of the drilling fluid.

2. The fluid of claim 1 wherein the water is sea water.

3. The fluid of claim 1 containing a minor proportion of oil.

4. The fluid of claim 1 further containing chrome lignosulfonate and chrome lignite.

5. The fluid of claim 1 wherein said sulfated ethylene oxide adduct is present to the extent of 0.25 to 6.0 pounds per barrel of well fluid.

6. The fluid of claim 1 wherein oil emulsified in the water is present to the extent of 1 to 10 volume percent of the well fluid.

7. The drilling fluid of claim 1 containing not more than 4% clay in volume.

8. The drilling fluid of claim 1 which the water is substantially saturated with salt.

9. An additive for an aqueous clay base drilling fluid consisting essentially of
   (A) from about 10 to about 90 weight percent of at least one of:
   (1) Formula I

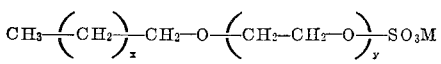

(2) Formula II

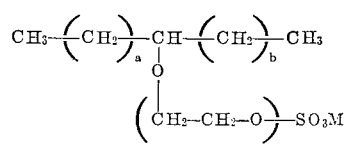

where
   $x$ is from 4 to 20; inclusive
   $y$ is from 1 to 10, inclusive
   $a$ is from 0 to 9, inclusive
   $b$ is from 0 to 9, inclusive
   $a$ plus $b$ is from 3 to 19, inclusive, and
   M is selected from the group consisting of alkali metal, alkaline earth metal, and ammonium
   (B) from about 1 to about 86 weight percent of at least one of monohydric alkyl alcohols having from 1 to 8 carbon atoms per molecule, inclusive, and triethylene glycol and
   (C) from about 4 to about 10 weight percent of at least one of aluminum stearate, alkali metal stearate, and alkaline earth metal stearate, all weight percents being based on the total weight of the additive.

10. The additive of claim 9 wherein there is additionally present from about 1 to about 50 weight percent based on the total weight of the additive of at least one oxy dibenzene material of the formulae

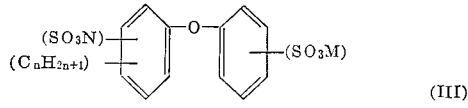

(III)

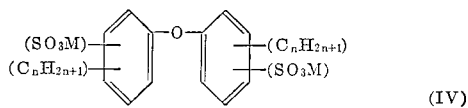

(IV)

wherein $n$ is from 8 to 16, M is selected from the group consisting of hydrogen, alkali metal, alkaline earth metal, and ammonium, and the sulfonate and ($C_nH_{2n+1}$) radicals are ortho, meta, or para to the oxygen linkage.

11. The additive of claim 10 wherein said oxy dibenzene material consists essentially of at least 50 weight percent of a compound of Formula III wherein M is sodium, $n$ is 12, the ($C_nH_{2n+1}$) radical is para to the oxygen linkage, and the sulfonate radicals are at least one of ortho and para to the oxygen linkage, the remainder of said oxy dibenzene material being substantially a compound of Formula IV wherein M is sodium, $n$ is 12, the ($C_nH_{2n+1}$) radicals are para to the oxygen linkage, and the sulfonate radicals are ortho to the oxygen linkage.

12. The additive of claim 9 wherein there is additionally present from about 1 to about 10 weight percent based on the total weight of the additive of wool grease.

13. The additive of claim 9 wherein there is additionally present from about 0.5 to about 2 weight percent based on the total weight of the additive of polyethylene oxide having a molecular weight of from about 300,000 to about 900,000.

14. The additive of claim 9 wherein from component (A) only compounds from Formula I are present, $x$ is from 10 to 14, inclusive, $y$ is from 1 to 5, inclusive, and M is sodium.

15. The additive of claim 9 wherein from component (A) only compounds from Formula II are present and $a$ plus $b$ is from 10 to 16.

16. The additive of claim 14 wherein there is additionally present from about 1 to about 10 weight percent wool grease, from about 0.5 to about 1 weight percent polyethylene oxide having a molecular weight of from about 300,000 to about 900,000, and sufficient sodium hydroxide to give the additive a pH of from about 6.5 to about 7, all percents being based on the total weight of the additive.

17. The additive of claim 16 wherein component (C) is aluminum stearate and contains from about 20 to about 30 weight percent of stearic acid that has not been combined with aluminum to give aluminum stearate, the weight percent stearic acid being based on the total weight of component (C).

References Cited

UNITED STATES PATENTS

| | | | |
|---|---|---|---|
| 3,009,874 | 11/1961 | Chisholm | 252—8.5 |
| 3,062,740 | 11/1962 | Reddie et al. | 252—8.5 |
| 3,085,977 | 4/1963 | Park et al. | 252—8.5 |
| 3,214,374 | 10/1965 | Sample | 252—8.5 |
| 3,215,200 | 11/1965 | Kirkpatrick et al. | 252—8.55 |
| 3,236,769 | 2/1966 | Burdyn et al. | 252—8.5 |

HERBERT B. GUYNN, Primary Examiner

U.S. Cl. X.R.

252—353